(12) United States Patent
Kang et al.

(10) Patent No.: US 12,205,226 B2
(45) Date of Patent: Jan. 21, 2025

(54) IMAGE-BASED LIGHTING EFFECT PROCESSING METHOD AND APPARATUS, AND DEVICE, AND STORAGE MEDIUM

(71) Applicant: Beijing Zitiao Network Technology Co., Ltd., Beijing (CN)

(72) Inventors: Qirun Kang, Beijing (CN); Guang Zeng, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/088,173

(22) Filed: Dec. 23, 2022

(65) Prior Publication Data

US 2023/0125255 A1  Apr. 27, 2023

Related U.S. Application Data

(63) Continuation of application No. PCT/CN2021/115590, filed on Aug. 31, 2021.

(30) Foreign Application Priority Data

Oct. 30, 2020 (CN) .......................... 202011195006.0

(51) Int. Cl.
*G06T 17/20* (2006.01)
*G02B 27/01* (2006.01)
(Continued)

(52) U.S. Cl.
CPC ............ *G06T 17/205* (2013.01); *G06T 19/20* (2013.01); *G02B 27/017* (2013.01); *G06F 3/011* (2013.01);
(Continued)

(58) Field of Classification Search
CPC ..... G06T 17/205; G06T 19/20; G06T 15/506; G06T 5/002; G06T 7/70; G06T 15/205; G06T 15/50; G06T 15/60
See application file for complete search history.

(56) References Cited

U.S. PATENT DOCUMENTS 8,400,555 B1 * 3/2013 Georgiev ............. H04N 23/957
348/222.1
9,123,272 B1    9/2015 Baldwin et al.
(Continued)

FOREIGN PATENT DOCUMENTS

CN    108525298 A    9/2018
CN    108765542 A    11/2018
(Continued)

OTHER PUBLICATIONS

Jensen, Realistic Image Synthesis Using Photon Mapping—A K Peters Ltd—2001 (Year: 2001).*
(Continued)

*Primary Examiner* — YuJang Tswei
(74) *Attorney, Agent, or Firm* — Astute IP Law Group

(57) ABSTRACT

An image-based lighting effect processing method and apparatus, and a device, and a storage medium are provided. The method includes: obtaining an image, a lighting effect material picture, and a first position of a simulated light source in a three-dimensional space, wherein the lighting effect material picture comprises lighting information; according to an object image in the image, generating a first three-dimensional mesh model of an object on the surface of the object image; determining lighting information of a point on the first three-dimensional mesh model according to the first position of the simulated light source, a distance between the point on the first three-dimensional mesh model and the surface of the image, and the lighting effect material picture; and rendering the object image in the image according to the
(Continued)

lighting information of the point on the first three-dimensional mesh model to obtain a first lighting effect rendered picture.

19 Claims, 8 Drawing Sheets

(51) Int. Cl.
| | |
|---|---|
| *G06F 3/01* | (2006.01) |
| *G06F 3/14* | (2006.01) |
| *G06T 5/80* | (2024.01) |
| *G06T 15/00* | (2011.01) |
| *G06T 19/00* | (2011.01) |
| *G06T 19/20* | (2011.01) |
| *G09G 5/12* | (2006.01) |
| *G09G 5/36* | (2006.01) |

(52) U.S. Cl.
CPC ............ *G06F 3/012* (2013.01); *G06F 3/1431* (2013.01); *G06F 3/1438* (2013.01); *G06T 5/80* (2024.01); *G06T 15/005* (2013.01); *G06T 19/006* (2013.01); *G06T 2200/04* (2013.01); *G09G 5/12* (2013.01); *G09G 5/363* (2013.01); *G09G 2352/00* (2013.01); *G09G 2360/06* (2013.01)

(56) References Cited

U.S. PATENT DOCUMENTS

| | | | | |
|---|---|---|---|---|
| 10,565,734 | B2* | 2/2020 | Bevensee | G06T 7/521 |
| 2003/0179197 | A1* | 9/2003 | Sloan | G06T 15/506 |
| | | | | 345/426 |
| 2006/0013454 | A1* | 1/2006 | Flewelling | A61B 1/043 |
| | | | | 382/128 |
| 2009/0219287 | A1* | 9/2009 | Wang | G01N 21/47 |
| | | | | 715/764 |
| 2012/0281273 | A1* | 11/2012 | Shinkai | G02F 1/133615 |
| | | | | 359/315 |
| 2013/0099675 | A1* | 4/2013 | Ma | G02B 6/0091 |
| | | | | 362/217.05 |
| 2014/0204087 | A1* | 7/2014 | Habel | G06T 15/506 |
| | | | | 345/426 |
| 2015/0233558 | A1* | 8/2015 | Ticktin | F21V 5/04 |
| | | | | 362/423 |
| 2016/0035133 | A1 | 2/2016 | Ye et al. | |
| 2017/0161939 | A1 | 6/2017 | Sugden et al. | |
| 2017/0163937 | A1* | 6/2017 | McNelley | H04N 7/144 |
| 2018/0260942 | A1* | 9/2018 | Jolly | H04N 19/98 |
| 2018/0330538 | A1* | 11/2018 | Petkov | G06T 15/06 |
| 2019/0025588 | A1* | 1/2019 | Osterhout | H04N 23/60 |
| 2019/0228567 | A1 | 7/2019 | Park et al. | |
| 2019/0378323 | A1* | 12/2019 | Bakalash | G06T 15/06 |
| 2020/0184714 | A1* | 6/2020 | Guo | G06T 15/50 |
| 2021/0065440 | A1* | 3/2021 | Sunkavalli | G06N 3/08 |

FOREIGN PATENT DOCUMENTS

| | | |
|---|---|---|
| CN | 109410308 A | 3/2019 |
| CN | 109446945 A | 3/2019 |
| CN | 110047122 A | 7/2019 |
| CN | 112270759 A | 1/2021 |

OTHER PUBLICATIONS

International Search Report issued in corresponding International Application No. PCT/CN2021/115590 dated Nov. 25, 2021.
Kolivand et al., "Shadow Generation in Mixed Reality: A Comprehensive Survey," IETE Technical Review, 2015, vol. 32, No. 1, pp. 3-15.
Partial Supplementary European Search Report in EP21884659.0, mailed Aug. 29, 2023, 16 pages.

* cited by examiner

IMAGE-BASED LIGHTING EFFECT PROCESSING METHOD AND APPARATUS, AND DEVICE, AND STORAGE MEDIUM

This application is a continuation of International Application No. PCT/CN2021/115590, filed on Aug. 31, 2021 which claims the priority to Chinese Patent Application No. 202011195006.0 titled "IMAGE-BASED LIGHTING EFFECT PROCESSING METHOD AND APPARATUS, AND DEVICE, AND STORAGE MEDIUM", filed on Oct. 30, 2020 with the China National Intellectual Property Administration (CNIPA), both of which are incorporated herein by reference in their entireties.

FIELD

The present disclosure relates to the technical field of image processing, in particular to an image-based lighting effect processing method and apparatus, a device and a storage medium.

BACKGROUND

A shooting function is provided for users according to the conventional technology. With increasing of the users capturing images with the shooting function, there is a great demand for adding a specific lighting effect to an image to make the lighting effect more natural and realistic.

SUMMARY

In order to solve or at least partially solve the above technical problem, an image-based lighting effect processing method and apparatus, a device and a storage medium are provided according to the present disclosure, to make lighting rendering effect of an image more natural and realistic.

In a first aspect, an image-based lighting effect processing method is provided according to an embodiment of the present disclosure. The method includes: acquiring an image, a lighting effect material image, and a first position of a simulated light source in a three-dimensional space, where the lighting effect material image includes lighting information; generating, based on to an object image in the image, a first three-dimensional grid model of an object on a surface of the object image; determining lighting information of points on the first three-dimensional grid model based on the first position of the simulated light source, distances from the points on the first three-dimensional grid model to a surface of the image, and the lighting effect material image; and rendering the object image in the image based on the lighting information of the points on the first three-dimensional grid model, and acquiring a first lighting effect rendering image of the image.

In a second aspect, a lighting effect processing apparatus is provided according to an embodiment of the present disclosure. The apparatus includes: an acquiring module configured to acquire an image, a lighting effect material image, and a first position of a simulated light source in a three-dimensional space, where the lighting effect material image comprises lighting information; a generating module configured to generate, based on an object image in the image, a first three-dimensional grid model of an object on a surface of the object image; a determining module configured to determine lighting information of points on the first three-dimensional grid model based on the first position of the simulated light source, distances from the points on the first three-dimensional grid model to a surface of the image, and the lighting effect material image; and a first rendering module configured to render the object image in the image based on the lighting information of the points on the first three-dimensional grid model, and acquire a first lighting effect rendering image of the image.

In a third aspect, a terminal device is provided according to an embodiment of the present disclosure. The terminal device includes a processor and a memory. The memory stores a computer program, and the computer program, when executed by the processor, causes the processor to implement the method according to the first aspect.

In a fourth aspect, a computer-readable storage medium is provided according to an embodiment of the present disclosure. The storage medium stores a computer program. The computer program, when executed by a processor, implements the method according to the first aspect.

In a fifth aspect, a computer program product is provided according to an embodiment of the present disclosure. The computer program product, when running on a terminal device, causes the terminal device to implement the method according to the first aspect.

Compared with the conventional technology, the technical solutions according to the embodiments of the present disclosure have the following advantages.

The essence of the technical solutions according to the embodiments of the present disclosure is to take depth information of a surface of an object in an actual three-dimensional space as one of considerations for image lighting rendering, so that the lighting rendering effect of the image can be more realistic and natural.

A hierarchical rendering strategy may be used in the technical solutions according to the embodiments of the present disclosure. Lighting and a shadow effect on the background image are first drawn, and then a lighting effect on an object image in the image is drawn. In this way, the lighting effect of the image is more natural and realistic.

A way for determining projection point in the technical solutions according to the embodiments of the present disclosure is simple, has low calculation amount, fast calculation speed and low requirements on performance of a terminal.

In the technical solutions according to the embodiments of the present disclosure, a boundary part between a second three-dimensional grid model and the image is smoothed. Thus, the naturalness of the formed lighting effect can be further improved. The second three-dimensional grid model is a three-dimensional grid model of the object generated over the object in the image based on a predetermined object matching algorithm.

BRIEF DESCRIPTION OF THE DINITIALINGS

The drawings herein are incorporated into the specification and constitute a part of the specification. The drawings show embodiments of the present disclosure. The drawings and the specification are used to explain the principle of the present disclosure.

In order to more clearly illustrate technical solutions in embodiments of the present disclosure or in the conventional technology, the drawings to be used in the description of the embodiments or the conventional technology are briefly described below. Apparently, those skilled in the art may obtain other drawings according to the provided drawings without any creative work.

DETAILED DESCRIPTION OF EMBODIMENTS

In order to make the purposes, features, and advantage of the present disclosure more apparent to understand, the solutions of the present disclosure are further described hereinafter. It should be noted that the embodiments of the present disclosure and the features in the embodiments may be combined with each other if there is no conflict.

In the following description, numerous specific details are set forth to provide thorough understanding of the present disclosure. The present disclosure may also be implemented in other ways different from those described here. Apparently, the embodiments in the specification are only a part of the embodiments of the present disclosure, rather than all the embodiments.

Figure 1:
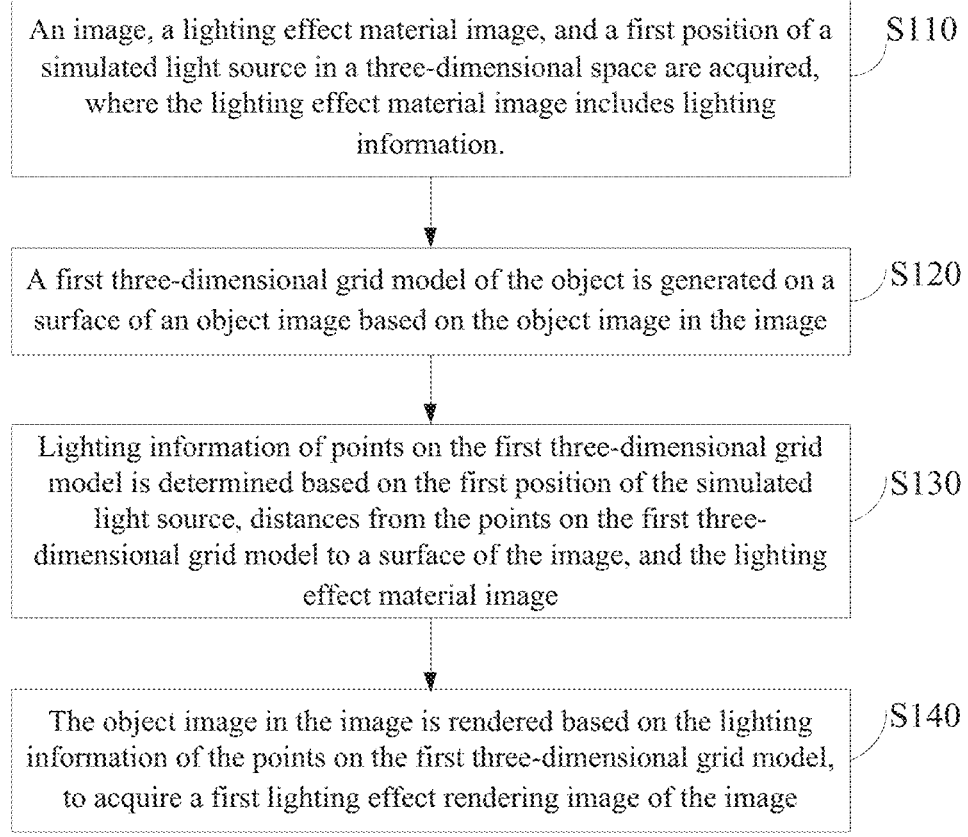
FIG. 1 is a flow chart of an image-based lighting effect processing method according to an embodiment of the present disclosure.

FIG. 1 is a flow chart of an image-based lighting effect processing method according to an embodiment of the present disclosure. The method may be performed by a terminal device. The terminal device may be understood as a device with image processing capability, such as a mobile phone, a tablet computer, a notebook computer, a desktop computer and a smart TV. In some embodiments, the terminal device described in the embodiment may be provided with an image display device (such as a display screen, but not limited to the display screen). The terminal device may display an image through the display screen, and add one or more lighting effects to the image by the method according to the embodiment. The lighting effect described in the embodiment may be superimposed on an image to make the image reflect a lighting effect. In other embodiments, the terminal device described in the embodiment may further be provided with a shooting device. After the shooting device captures an image, the terminal device may add one or more lighting effects to the image by the method according to the embodiment. As shown in FIG. 1, the method according to the embodiment includes the following steps S110 to S140.

In step S110, an image, a lighting effect material image, and a first position of a simulated light source in a three-dimensional space are acquired, where the lighting effect material image includes lighting information.

The image is a picture with visual effect that is required to be added lighting effect. The image includes at least one object. The object may be a person, an animal or an article. A source of the image is not limited in the present disclosure. In an embodiment, the image may be captured by a terminal. Alternatively, the terminal may acquire the image from another terminal through Bluetooth. Alternatively, the image may be downloaded from a server.

The simulated light source is a simulation of a light source in the real world. The simulated light source may specifically be a simulation of sunlight, a simulation of a stage light, a simulation of a spotlight, and the like, which is not limited in the present disclosure. It should be noted that in the present disclosure, the simulated light source is used to determine the lighting effect formed subsequently, which unnecessarily appears in the image acquired by lighting effect processing.

In the real world, a position, a shape and an area of a shadow formed by the light source around the object change with a position of the light source relative to an object. In order to make an effect acquired by performing lighting effect processing on the image is the same as that in the real world, the position of the simulated light source in the three-dimensional space needs to be obtained. In order to facilitate the distinction, the position of the simulated light source in the three-dimensional space is described as the first position in the embodiment. Here, "three-dimensional space" is a simulation result of a space of the real world. The first position of the simulated light source in the three-dimensional space is acquired, to determine a position relationship between the object in the image and the simulated light source.

Figure 2:
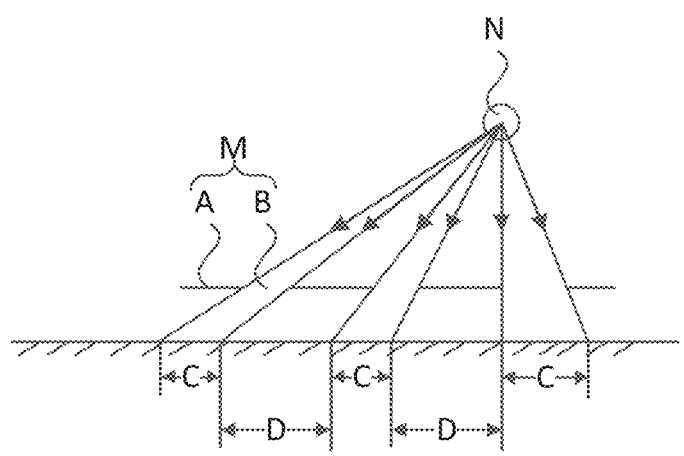
FIG. 2 is a schematic diagram of lighting in the real word according to an embodiment of the present disclosure.

In the real world, in some scenarios, light emitted by the light source may pass through some obstacles to project onto the object, forming a mottled light shadow. For example, as shown in FIG. 2, an obstacle M includes a light-transmitting region B and a light-shielding region A. Light of sun N passes through the light-transmitting region B (such as gaps between leaves) of the obstacle M and shines on the ground. Multiple light spots C with different sizes and shapes are shown on ground. In order to simulate this scenario, the lighting effect material image may be set. It can be seen that the lighting effect material image may be a material used to simulate the light spots C with a specific pattern formed by the obstacle M. In an embodiment, the lighting effect material image may be regarded as a simulation result of a set of light spots formed on the ground in FIG. 2. FIG. 2 is a schematic diagram of lighting in the real world according to an embodiment of the present disclosure.

Figure 3:
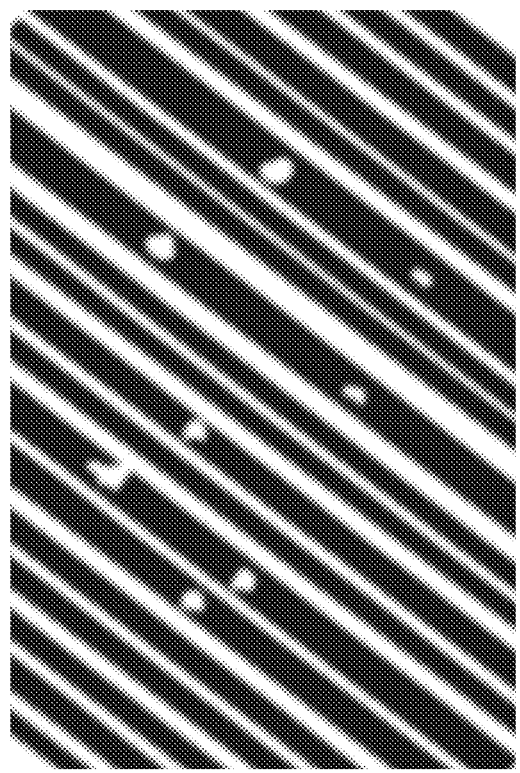
FIG. 3 is a schematic diagram of a lighting effect material image according to an embodiment of the present disclosure.

The lighting information is information of light and dark, and may be represented by a brightness value or a gray value. The lighting effect material image including lighting information is that the lighting effect material image includes data that can reflect light and dark information of different positions on the lighting effect material image. For example, as shown in FIG. 3, a white region simulates the light spot formed by the light emitted by the simulated light source passing through the light-transmitting region of the obstacle, and a black region simulates a place where the light emitted by the simulated light source cannot reach due to obstructions blocked by the obstacle. FIG. 3 is a schematic diagram of a lighting effect material image according to an embodiment of the present disclosure.

In addition, step S110 may be implemented in multiple ways. For example, the user may input user instructions through a human-computer interaction device. The user instructions include an image to be subjected to lighting effect processing, a selected lighting effect material image, and the first position of the designated simulated light source in the three-dimensional space. The image to be subjected to lighting effect processing, the selected lighting effect material image, and the first position of the designated simulated light source in the three-dimensional space are acquired by analyzing the user instructions.

In step S120, a first three-dimensional grid model of the object is generated on a surface of an object image based on the object image in the image.

Since the object is three-dimensional in the real world, the essence of this step is to restore stereoscopy of the object in the image based on the image before lighting effect processing.

In a digitized image, each pixel is described by a set of binary numbers. The set of binary numbers includes a bit representing an image color. The number of binary bits occupied by colors of respective pixels in the image is called as an image depth. The image depth determines the number of colors that respective pixels of a color image may have, or determines a gray-scale level that respective pixels of a grayscale image may have. The image depth determines the maximum number of colors that may appear in the color image, or the maximum gray-scale level in the grayscale image.

The step is implemented in multiple ways. For example, the first three-dimensional grid model of the object may be generated on the surface of the object image according to the depth information of the object image in the image.

In addition, in practices, a category of the object in the image may further be first determined, and an appropriate algorithm is selected according to the category of the object in the image. Then, the first three-dimensional grid model of the object is generated on the surface of the object image based on the algorithm and the depth information of the object image in the image. Since different types of objects have different features, an algorithm is selected based on a type of the object, so that the first three-dimensional grid model is in accordance with the surface of the object, which is beneficial to forming a natural effect by subsequently adding the lighting effect.

For example, if the object in the image is a human face, a first three-dimensional grid model of the human face is generated on a surface of the human face by using a human face matching algorithm (such as a facefitting algorithm).

In step S130, lighting information of points on the first three-dimensional grid model is determined based on the first position of the simulated light source, distances from the points on the first three-dimensional grid model to a surface of the image, and the lighting effect material image.

Figure 4:
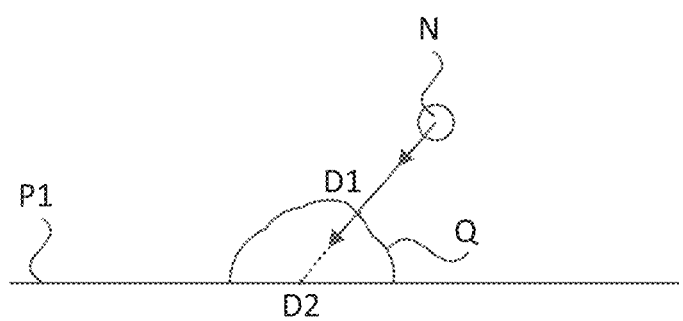
FIG. 4 is a schematic diagram of a second position of a shadow, which is formed by illuminating an object by a simulated light source, on an image according to an embodiment of the present disclosure.

The step is implemented in multiple ways. For example, for each point on the first three-dimensional grid model, a projection point of the point illuminated by the simulated light source on a first lighting effect image are determined, based on the first position of the simulated light source and the distance from the point to the surface of the image. Lighting information of the projection point corresponding to the point on the first three-dimensional grid model is determined as the lighting information of the point on the first three-dimensional grid model. For the convenience of understanding, the following description is made with reference to FIG. 4. FIG. 4 is a schematic diagram of a determination of lighting information of a point on a first three-dimensional grid model according to an embodiment of the present disclosure.

As shown in FIG. 4, a point D1 on the first three-dimensional grid model is illuminated by the simulated light source N, to form a projection point D2 on a lighting effect material image P1. The lighting effect material image herein may be understood as to be overlapped with the image acquired in step S110. In this case, lighting information of the point D2 on the lighting effect material image P1 is determined as lighting information of the point D1.

The projection point D2 of the point D1 on the lighting effect material image P1 is determined in multiple ways. For example, a plane where the image is located is defined as a reference plane, orthogonal X-axis and Y-axis are established on the plane, and a direction perpendicular to the reference plane and pointing to a side of the simulated light source is defined as a positive direction of Z-axis, so as to establish a rectangular coordinate system. Assuming that coordinates of the simulated light source are (x1, y1, z1), coordinates of the point D1 are (x0, y0, z0), and coordinates of the projection point D2 are (u, v, 0), then u and v may be calculated respectively according to the following equation (1) and equation (2):

$$u = x0 - (x0 - x1) \cdot z0/(z0 - z1) \tag{1}$$

$$v = y0 - (y0 - y1) \cdot z0/(z0 - z1) \tag{2}$$

The way of determining the projection point is simple, has low calculation amount, fast calculation speed and low requirements on performance of a terminal.

In step S140, the object image in the image is rendered based on the lighting information of the points on the first three-dimensional grid model, to acquire a first lighting effect rendering image of the image.

Those skilled in the art may understand that, for the same illumination range (such as a desktop of a table) determined on a plane in the real world, the position of the light source is unchanged, and the light source illuminates this range through the obstacle as shown in FIG. 2 for the first time, to show a light spot effect as the first lighting effect. An object (such as a teapot) is arranged within the illumination range, and the same light source illuminates the range again through the same obstacle, to show a light spot effect as a second lighting effect. Compared the first lighting effect with the second lighting effect, it can be found that an edge of a light spot in the second lighting effect is misaligned with respect to the first lighting effect. This is because the object is three-dimensional, and the shape and size of the light spot is changed due to the three-dimensional feature.

The essence of steps S130 and S140 is to determine the lighting information of the point on the first three-dimensional grid model based on a coordinate of the point on the first three-dimensional grid model in the Z-axis direction, to simulate the misalignment of the edge of the light spot due to the stereoscopy of the object, so as to improve the consistency between the lighting effect presented by the object and the lighting effect in the real world and make the lighting effect more natural.

If other parts of the image except the object image are defined as a background image, a hierarchical rendering strategy may further be used in the above technical solution, lighting and a shadow effect of the background image are first drawn, and then a lighting effect on the three-dimensional model of the object is drawn, so that the lighting effect is natural and realistic.

The background image and a shadow of the object are rendered in multiple ways according to the embodiments of the present disclosure. For example, in an embodiment, a background part of the image may be rendered based on lighting information of the lighting effect material image, and the shadow of the object is acquired by rendering the image based on the first position of the simulated light source.

The background part of the image is rendered based on the lighting information of the lighting effect material image in multiple ways. For example, the lighting effect material image is fused with the image to be added with lighting effect in a fusion algorithm. Specifically, a correspondence between positions in the lighting effect material image and positions in the image to be added with the lighting effect is first determined; the lighting information of positions in the image to be added with the lighting effect is determined based on the lighting effect of the lighting effect material image and the correspondence; and the image to be added with the lighting effect is rendered based on the lighting information of positions in the image to be added with the lighting effect.

In addition, the size of the lighting effect material image may further be adjusted before fusion, so that the size of the lighting effect material image is the same as the size of the image to be added with the lighting effect, so as to determine the lighting information of position in the image to be added with the lighting effect.

In fusion processing, an average, entropy, a standard deviation and an average gradient of pixel values at corresponding positions of the lighting effect material image and the image to be added the lighting effect may be used to fuse the lighting effect material image with the image to be added with the lighting effect.

It should be noted that if other parts of the image except the object image are called as the background image, both the object image and the background image are required to be fused with the lighting effect material image during rendering the background image.

The shadow of the object is acquired by rendering the image based on the first position of the simulated light source in multiple ways. For example, a second position of a shadow, formed by illuminating the object by the simulated light source, on the image may be determined based on the first position of the simulated light source; and rendering is performed on the second position of the image to acquire the shadow.

Figure 5:
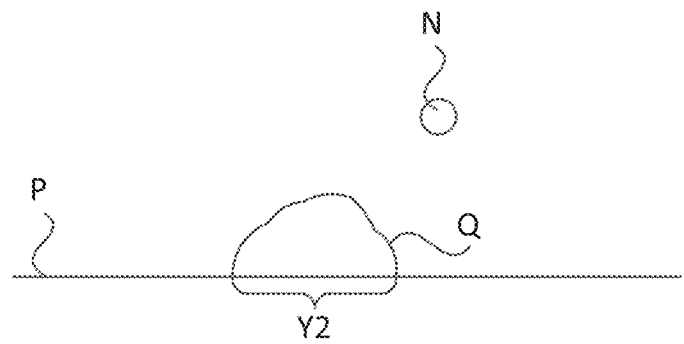
FIG. 5 is a schematic diagram of a second position of a shadow, which is formed by illuminating an object by a simulated light source, on an image according to another embodiment of the present disclosure.

In addition, the second position of the shadow, formed by illuminating the object by the simulated light source, on the image may be determined based on the first position of the simulated light source in multiple ways. For example, the object image may be segmented and removed from the image to acquire a mask of a region where the object image is located. An offset of the mask relative to the region is determined based on the first position of the simulated light source. The second position of shadow of the object on the image is determined based on the offset. For the convenience of understanding, the following description is made with reference to FIG. 5. FIG. 5 is a schematic diagram of a second position of a shadow, which is formed by illuminating an object by a simulated light source, on an image according to an embodiment of the present disclosure.

In an embodiment, as shown in FIG. 5, Y2 is a mask of a region where an object Q is located before the object Q is illuminated by a simulated light source N. A position of Y2 relative to an image P is an initial position of the mask. An illumination direction of light emitted from the simulated light source N may be acquired based on the first position of the simulated light source N and a position of the object Q. The offset of the mask relative to the initial position of the mask may be calculated based on the illumination direction. Subsequently, the second position of the shadow of the object on the image is determined based on the initial position of the mask and the offset of the mask relative to the initial position of the mask.

Figure 6:
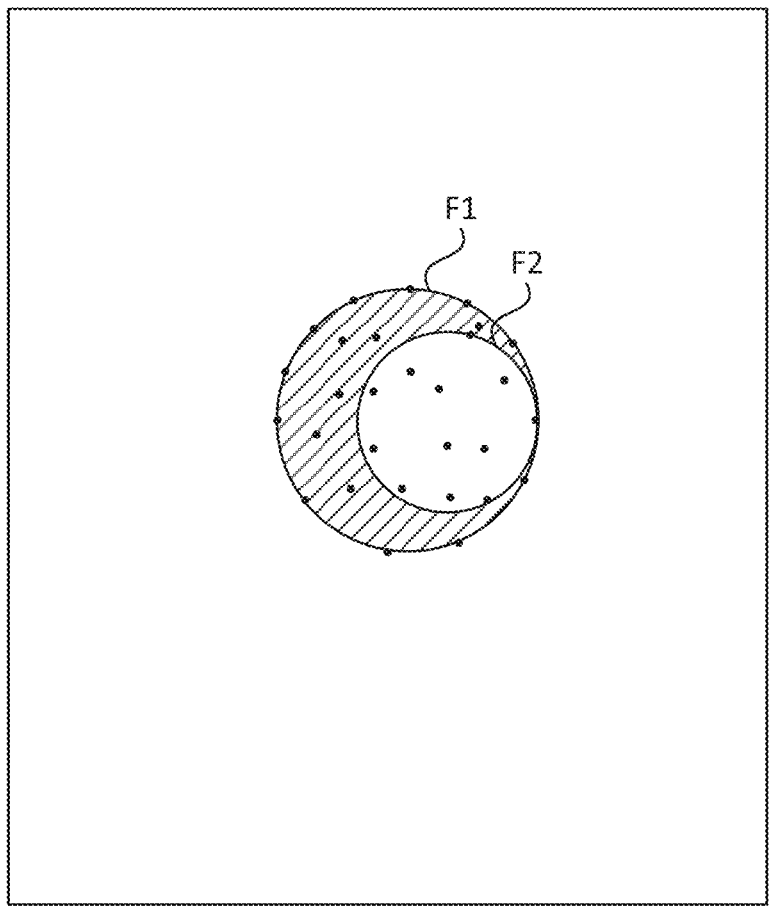
FIG. 6 is a schematic diagram of determining lighting information of points on a first three-dimensional grid model according to an embodiment of the present disclosure.

In an embodiment, the process that the second position of the shadow, formed by illuminating the object by the simulated light source, on the image may be determined based on the first position of the simulated light source may further include: determining projection points of the points on the first three-dimensional grid model after being illuminated by the simulated light source on the image, based on the first position of the simulated light source; and determining a contour graph formed all projection points based on all projection points. For example, if all points in FIG. 6 are the projection points of the points on the same first three-dimensional grid model after being illuminated by the simulated light source on the image, a circle F1 in FIG. 6 is a contour graph formed by all the projection points. It can be seen from FIG. 6 that a contour graph F1 is a graph acquired by fitting outermost points among all the projection points. Except for projection point located at the contour graph, other projection points are located within the contour graph. Finally, the object image is removed from the contour graph, to acquire an object; and the second position of the shadow, formed by illuminating the object by the simulated light source, on the image is obtained. As shown in FIG. 6, a circle F2 is the object image, and the object image (that is, the circle F2) is removed from the contour graph F1 to acquire a region filled with diagonal lines. The position of the region filled with diagonal lines is the second position of the shadow, formed by illuminating the object by the simulated light source, on the image. In addition, a method for determining a projection point is further provided according to the above technical solution. This method is simple, has low calculation, fast calculation speed, and low requirements on performance of a terminal. FIG. 6 is a schematic diagram of a second position of a shadow, which is formed by illuminating an object by a simulated light source, on an image according to another embodiment of the present disclosure.

Based on the above technical solution, in an embodiment, after the acquiring the first lighting effect rendering image, the image-based lighting effect processing method may further include: processing the first lighting effect rendering image based on a predetermined diffuse reflection lighting model to acquire a second lighting effect rendering image of the image, which can make the lighting effect more natural and realistic. In an embodiment, in practices, the first lighting effect image is processed by a Phong lighting model based on depth and normal information to acquire the second lighting effect rendering image.

In the real world, luminosity is used to represent a degree of an object being illuminated. For the same light source, the luminosity on an illuminated surface is reduced with the increase of a distance from the light source to the illuminated surface, and the illuminated surface is getting darker; and the luminosity on the illuminated surface is increased with the reduction of the distance from the light source to the illuminated surface, and the illuminated surface is getting brighter. Based on this, theoretically, in the virtual world, a distance from a point on the first three-dimensional grid model to the simulated light source is reduced with the increase of a coordinate value of the point in the Z-axis direction, and the point is getting brighter; and the distance from the point on the first three-dimensional grid model to the simulated light source is increased with the reduction of the coordinate value of the point in the Z-axis direction, and the point is getting darker. Therefore, based on the above technical solutions, the lighting information of the point on the first three-dimensional grid model may further be modified based on the coordinate value of the point on the first three-dimensional grid model in the Z-axis direction, so as to further improve the consistency of the lighting effect presented by the object with the lighting effect of the object in the real world.

Specifically, it is assumed that the lighting information is represented by the gray value, and the gray value is increased with the increase of the coordinate value of the point on the first three-dimensional grid model in the Z-axis direction. In an embodiment, a conversion relationship between the coordinate value in the Z-axis direction and a lighting information correction parameter is determined in advance. For example, a predetermined weight value is set, and the coordinate value is multiplied by the predetermined weight value, to obtain a product result (that is, the lighting information correction parameter) with a range from 0 to 255. Subsequently, final lighting information of the point is determined based on the lighting information of the point on the first three-dimensional grid model acquired in step S140 and the lighting information correction parameter of the point. When step S140 is performed, the object image is rendered based on the modified lighting information of the point on the first three-dimensional grid model to acquire the first lighting effect rendering image.

Figure 7:
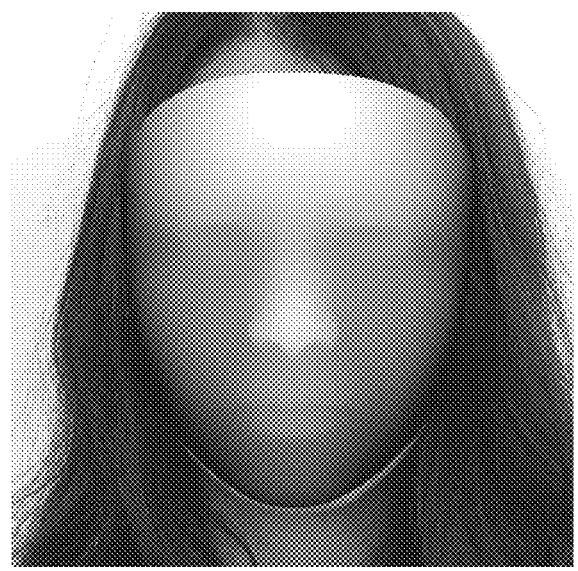
FIG. 7 is a schematic diagram of a situation that may occur in practice according to an embodiment of the present disclosure.

In addition, in practices, after S120 is performed, an unnatural cross section may be formed at a junction of a region near a boundary in the first three-dimensional grid model and the background due to uneven depth transition. For example, it is assumed that the object in the image is a human face, and other parts of the image are considered as a background except the human face. If a first three-dimensional grid model of the human face is generated directly on a surface of the human face, a gray-scale level of a plane (that is, a reference plane, which may be understood as a plane where the background image is located) where the image is located is set to 0, and is represented as black (not shown in FIG. 7). The Z-axis coordinates of the first three-dimensional grid model are converted to the gray-scale levels, and a result of the conversion is draw as shown in FIG. 7. In FIG. 7, the color is lighter with increase of a height of the first three-dimensional grid model of the human face above the plane. Since a position of a forehead is obviously higher than the reference plane, color transition at the position of the forehead is uneven, the color suddenly changes to form a fault. If lighting effect processing is performed directly based on the three-dimensional grid model, the unnatural cross section is generated at the junction of the human face and the background. FIG. 7 is a schematic diagram of a situation that may occur in practice according to an embodiment of the present disclosure.

Figure 8:
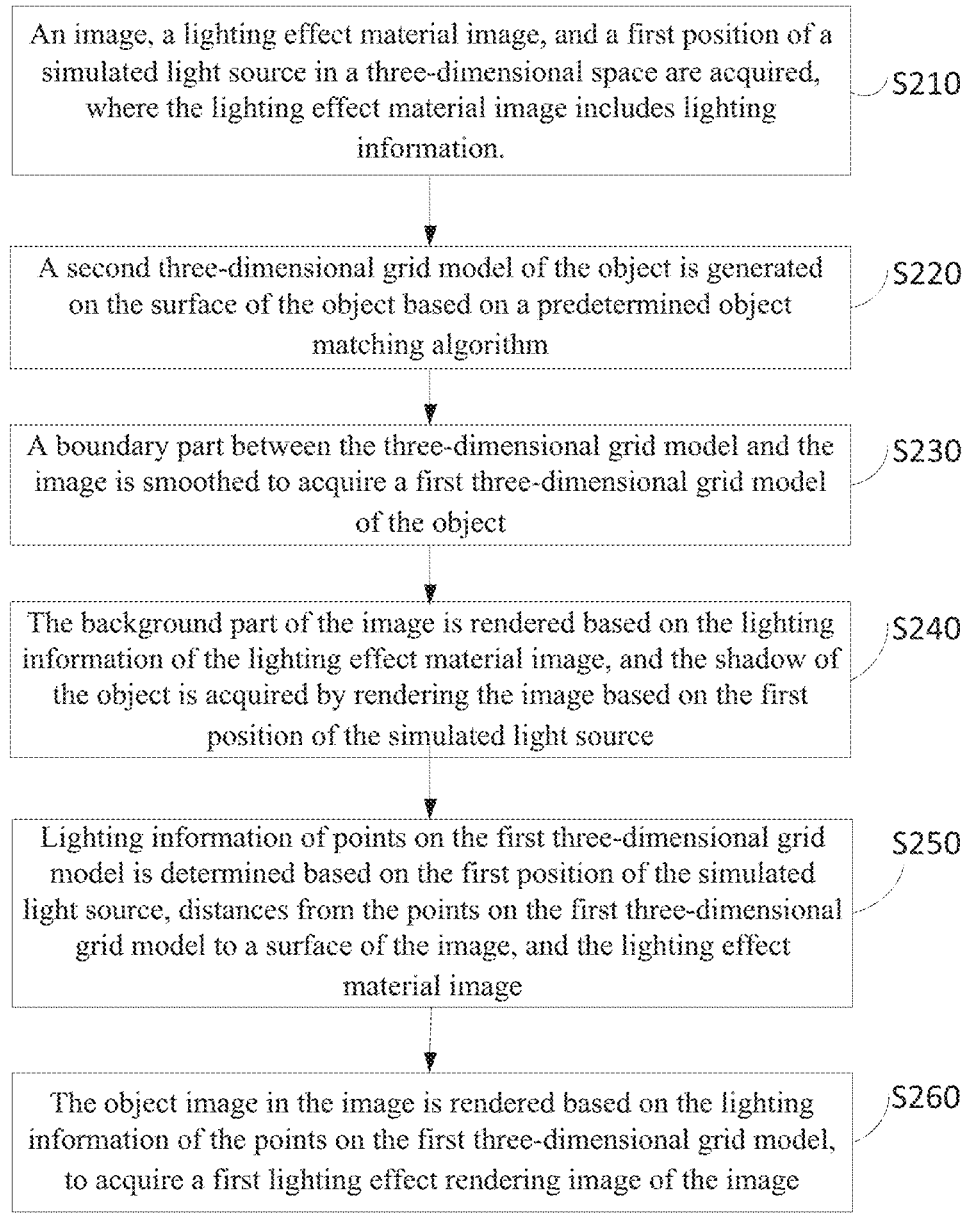
FIG. 8 is a flow chart of an image-based lighting effect processing method according to another embodiment of the present disclosure.

In order to solve the disadvantage shown in FIG. 7 described above, an image-based lighting effect processing method is further provided according to another embodiment of the present disclosure, and is described with reference to FIG. 8 below. FIG. 8 is a flow chart of an image-based lighting effect processing method according to another embodiment of the present disclosure. FIG. 8 is a specific example of FIG. 7.

As shown in FIG. 8, the image-based lighting effect processing method may include the following steps S210 to S260.

In step S210, an image, a lighting effect material image, and a first position of a simulated light source in a three-dimensional space are acquired, where the lighting effect material image includes lighting information.

It should be noted that the relevant contents of step S210 may refer to the relevant contents of step 110 described above.

In step S220, a second three-dimensional grid model of the object is generated on the surface of the object based on a predetermined object matching algorithm.

The predetermined object matching algorithm is a predetermined algorithm for generating a three-dimensional grid model of the object on a surface of an object image based on depth information of the object image in the image. The predetermined object matching algorithm is not limited in the embodiment of the present disclosure, which may be for example a human face matching algorithm.

Herein, the second three-dimensional grid model is the three-dimensional grid model generated only based on the depth information of the object image in the image. The three-dimensional grid model may have a problem of unnatural cross section due to the uneven depth transition.

In step S230, a boundary part between the three-dimensional grid model and the image is smoothed to acquire a first three-dimensional grid model of the object.

This step is implemented in multiple ways. In an embodiment, the ways may include inserting multiple points around the object on the image; connecting the multiple points with points on an edge of the second three-dimensional grid model respectively to generate new grids; and generating the first three-dimensional grid model of the object based on the new grids and the second three-dimensional grid model.

Insertion positions of the inserted points may be located in the background image of the image, which will not be limited in the present disclosure. The inserted points may be located at an edge of the image, or may not be located at the edge of the image. The points may be inserted near a region where a natural cross section may exist, or inserted at all regions around the object regardless of whether a natural section exists.

If the plane where the background image is located is regarded as the reference plane, the second three-dimensional grid model is equivalent to a bulge located on the reference plane, so that the new grid generated by connecting each of the multiple points with the point on the edge of the second three-dimensional grid model is equivalent to a slope connecting an edge of the bulge with the reference plane.

Figure 9:
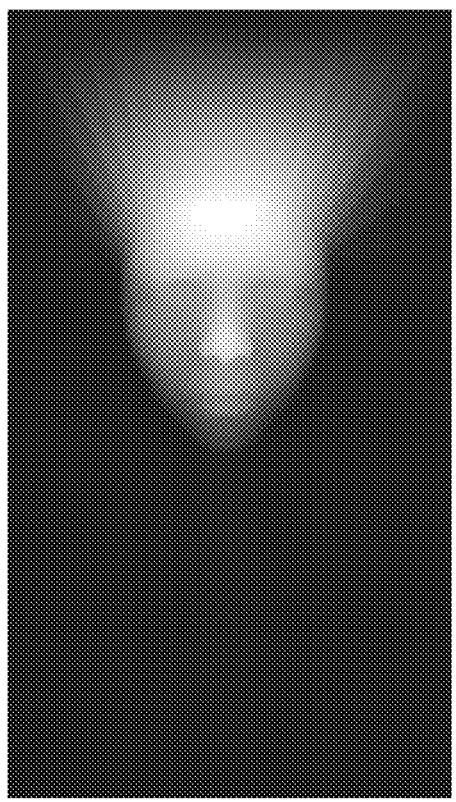
FIG. 9 is a schematic diagram of an image after step S230 is performed according to another embodiment of the present disclosure.

To facilitate the understanding of the step S230, the following description is made in combination with FIG. 9. FIG. 9 is a schematic diagram of an image after step S230 is performed according to an embodiment of the present disclosure.

As an example, in the case that a depth of the inserted points is set to zero, newly inserted points may be connected with outermost vertices of an initial three-dimensional model of the human face, to acquire a drawn result as shown in FIG. 9. It can be seen that a gradual effect from the forehead to an upper edge of the image is presented in FIG. 9. Since the insertion points are sparse, there are some artifacts of the grids. In practices, the inserted points are denser, the gradient effect is better. It can be seen from the above contents that the above method can solve the problem of unnatural cross section caused by the uneven depth transition at the boundary of the edge of the object and the background.

Figure 10:
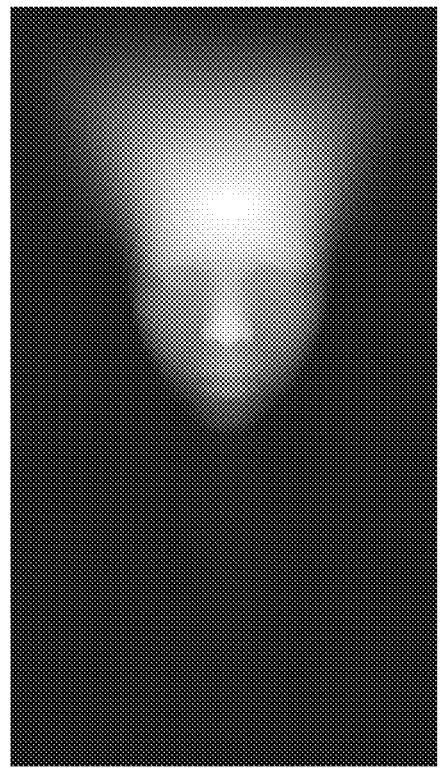
FIG. 10 is a schematic diagram of an image after step S230 is performed according to another embodiment of the present disclosure.

In addition, in order to further make the lighting effect more natural and realistic, the generating the first three-dimensional grid model of the object based on the new grids and the second three-dimensional grid model may be replaced by acquiring a third three-dimensional grid model of the object based on the new grids and the second three-dimensional grid model; and filtering the third three-dimensional grid model to acquire the first three-dimensional grid model of the object. As an example, FIG. 10 shows a result of filtering the image of FIG. 9. Apparently, compared with FIG. 9, the lighting effect in FIG. 10 is more natural and realistic. FIG. 10 is a schematic diagram of an image after step S230 is performed according to another embodiment of the present disclosure.

In an embodiment, the filtering includes mean filtering.

In step S240, the background part of the image is rendered based on the lighting information of the lighting effect material image, and the shadow of the object is acquired by rendering the image based on the first position of the simulated light source.

It should be noted that the relevant contents of step S240 may refer to the relevant contents of rendering the background part of the image based on the lighting information of the lighting effect material image and acquiring the shadow of the object by rendering the image based on the first position of the simulated light source.

In step S250, lighting information of points on the first three-dimensional grid model is determined based on the first position of the simulated light source, distances from the points on the first three-dimensional grid model to a surface of the image, and the lighting effect material image.

It should be noted that the relevant contents of step S250 may refer to the relevant contents of step S130 described above.

In step S260, the object image in the image is rendered based on the lighting information of the points on the first three-dimensional grid model, to acquire a first lighting effect rendering image of the image.

It should be noted that the relevant contents of step S260 may refer to the relevant contents of step S140 described above.

Based on the relevant contents of steps S210 to S260 described above, it can be seen that a boundary part between the second three-dimensional grid model and the image is smoothed according to the technical solutions of the present disclosure, and thus the formed lighting effect is more natural and realistic.

Figure 11:
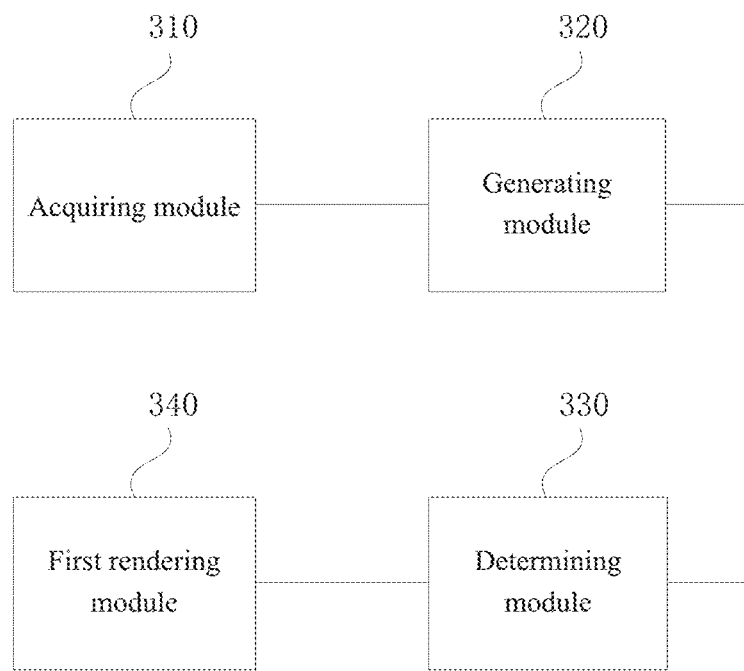
FIG. 11 is a structural block diagram of a lighting effect processing apparatus according to an embodiment of the present disclosure.

A lighting effect processing apparatus is further provided according to an embodiment of the present disclosure. FIG. 11 is a structural block diagram of a lighting effect processing apparatus according to an embodiment of the present disclosure. As shown in FIG. 11, the lighting effect processing apparatus includes: an acquiring module 310, a generating module 320, a determining module 330 and a first rendering module 340.

The acquiring module 310 is configured to acquire an image, a lighting effect material image, and a first position of a simulated light source in a three-dimensional space, where the lighting effect material image includes lighting information.

The generating module 320 is configured to generate, based on to an object image in the image, a first three-dimensional grid model of an object on a surface of the object image.

The determining module 330 is configured to determine lighting information of points on the first three-dimensional grid model based on the first position of the simulated light source, distances from the points on the first three-dimensional grid model to a surface of the image, and the lighting effect material image The first rendering module 340 is configured to render the object image in the image based on the lighting information of the points on the first three-dimensional grid model, and acquiring a first lighting effect rendering image of the image.

In an embodiment, the device further includes: a second rendering module. The second rendering module is configured to render a background part of the image based on lighting information of the lighting effect material image.

In an embodiment, the device further includes: a third rendering module. The third rendering module is configured to render the image based on the first position of the simulated light source to acquire a shadow of the object.

In an embodiment, the device further includes: a diffuse reflection processing module. The diffuse reflection processing module is configured to process the first lighting effect rendering image based on a predetermined diffuse reflection lighting model, to acquire a second lighting effect rendering image of the image.

In an embodiment, the generating module 320 includes a first generating sub-module and a smoothing sub-module.

The first generating sub-module is configured to generate a second three-dimensional grid model of the object on a surface of the object based on a predetermined object matching algorithm.

The smoothing sub-module is configured to smooth a boundary part between the second three-dimensional grid model and the image to acquire the first three-dimensional grid model of the object.

In an embodiment, the smoothing sub-module includes an insertion sub-unit, a first generating sub-unit and a second generating sub-unit.

The insertion sub-unit is configured to insert multiple points around the object on the image.

The first generating sub-unit is configured to connect the multiple points with points on an edge of the second three-dimensional grid model to generate new grids.

The second generating sub-unit is configured to generate the first three-dimensional grid model of the object based on the new grids and the second three-dimensional grid model.

In an embodiment, the second generating sub-unit is configured to:
    acquire a third three-dimensional grid model of the object based on the new grids and the second three-dimensional grid model; and
    performing a filtering process on the third three-dimensional grid model to acquire the first three-dimensional grid model of the object.

In an embodiment, the filtering process includes mean filtering.

In an embodiment, the third rendering module includes: a determining sub-module and a rendering sub-module.

The determining sub-module is configured to determine a second position of a shadow formed by illuminating the object by the simulated light source on the image, based on the first position of the simulated light source.

The rendering sub-module is configured to render the image at the second position to acquire the shadow.

In an embodiment, the determining sub-module includes a segmenting sub-unit, a first determining sub-unit, and a second determining sub-unit.

The segmenting sub-unit is configured to segment and remove the object image from the image to acquire a mask of a region where the object image is located.

The first determining sub-unit is configured to determine an offset of the mask relative to the region based on the first position of the simulated light source.

The second determining sub-unit is configured to determine the second position of the shadow of the object on the image based on the offset of the mask relative to the region.

In an embodiment, the determining module is configured to:
- determine projection points of the points of the first three-dimensional grid model after being illuminated by the simulated light source on a first lighting effect image based on the first position of the simulated light source, and the distances from the points on the first three-dimensional grid model to the surface of the image; and
- determine lighting information of the projection points corresponding to the points on the first three-dimensional grid model, as the lighting information of the points on the first three-dimensional grid model.

The lighting effect processing apparatus according to the embodiments of the present disclosure may be used to implement the lighting effect processing method according to any one of the embodiments of the present disclosure, and thus has the same or corresponding beneficial effects as the lighting effect processing method, which will not be repeated herein.

A terminal device is further provided according to an embodiment of the present disclosure. The terminal device includes a processor and a memory. The memory stores a computer program. The computer program, when executed by the processor, performs the method according to any one of the embodiments in FIGS. 1 to 10 described above.

Figure 12:
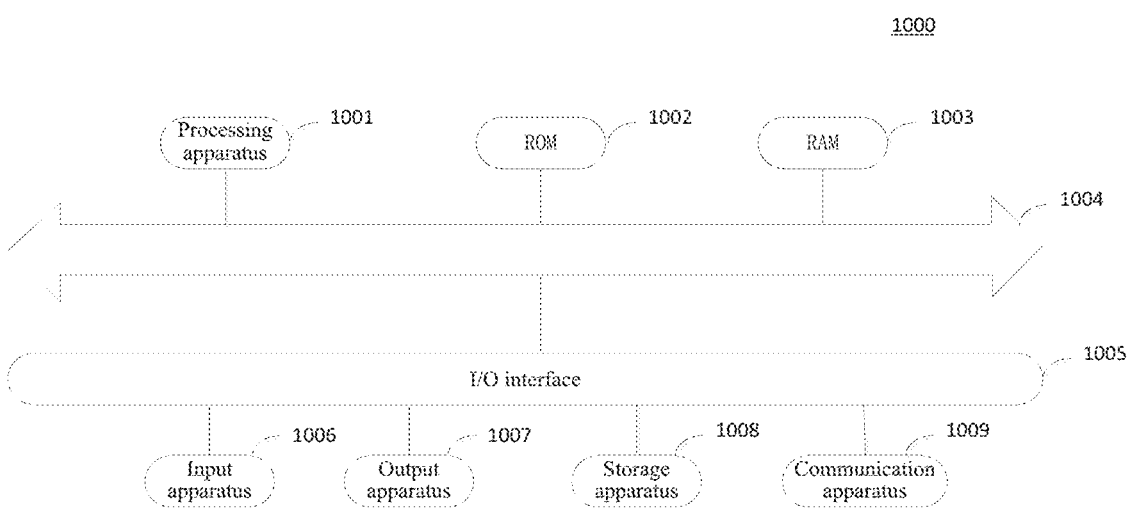
FIG. 12 is a schematic structural diagram of a terminal device according to an embodiment of the present disclosure.

For example, FIG. 12 is a schematic structural diagram of a terminal device according to an embodiment of the present disclosure. Reference is made to FIG. 12, which shows a schematic structural diagram suitable for implementing a terminal device 1000 according to the embodiment of the present disclosure. The terminal device 1000 according to the embodiment of the present disclosure may include, but is not limited to, mobile terminals, such as a mobile phone, a laptop computer, a digital broadcast receiver, a PDA (personal digital assistant), a PAD (tablet PC), a PMP (portable multimedia player), a vehicle-mounted terminal (such as in-vehicle navigation terminal) and the like; and fixed terminals such as a digital TV, a desktop computer, and the like. The terminal device shown in FIG. 12 is only exemplary, and should not indicate any limitation to the function and scope of application of the embodiment of the present disclosure.

As shown in FIG. 12, the terminal device 1000 may include a processing apparatus (such as a central processing unit or a graphics processor) 1001, which may execute various operations and processing based on a program stored in a read-only memory (ROM) 1002 or a program loaded from a storage apparatus 1008 into a random-access memory (RAM) 1003. Various programs and data are stored in the RAM 1003, which are required by the terminal device 1000 to perform an operation. The processing apparatus 1001, the ROM 1002 and the RAM 1003 are connected to each other through a bus 1004. An input/output (I/O) interface 1005 is also connected to the bus 1004.

Generally, the I/O interface 1005 may be connected to the following apparatuses: an input apparatus 1006, such as a touch screen, a touch panel, a keyboard, a mouse, a camera, a microphone, an accelerometer, and a gyroscope; an output apparatus 1007, such as a liquid crystal display (LCD), a speaker, and a vibrator; a storage apparatus 1008 such as a magnetic tape and a hard disk; and a communication apparatus 1009. The communication apparatus 1009 may enable wireless or wired communication between the terminal device 1000 and other device for data exchanging. Although FIG. 12 shows the terminal device 1000 having various apparatuses, it should be understood that the illustrated apparatuses are unnecessarily required to all be implemented or embodied. Alternatively, more or fewer apparatuses may be implemented or included.

Particularly, according to the embodiment of the present disclosure, the process described above in conjunction with flow chart may be implemented as a computer software program. For example, a computer program product is further provided according to an embodiment of the present disclosure. The computer program product includes a computer program carried on a non-transitory computer readable medium. The computer program includes program codes for performing the method shown in the flow chart. In the embodiment, the computer program may be downloaded and installed from the network via the communication apparatus 1009, or installed from the storage apparatus 1008, or installed from the ROM 1002. When the computer program is executed by the processing apparatus 1001, the functions defined in the method according to the embodiment of the present disclosure are performed.

It should be noted that, the computer readable medium mentioned in the present disclosure may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. More specific examples of the computer readable storage medium may include, but are not limited to, an electrical connection with one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the present disclosure, the computer readable storage medium may be any tangible medium including or storing a program, and the program may be used by or in combination with an instruction execution system, apparatus, or device. In the present disclosure, the computer readable signal medium may include a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and may send, propagate or transmit programs to be used by or in combination with the instruction execution system, apparatus or device. The program codes stored in the computer readable medium may be transmitted via any proper medium including but not limited to: a wire, an optical cable, RF (radio frequency) and the like, or any proper combination thereof.

In some embodiments, a client device and a server may perform communication using any currently known or future developed network protocol such as HTTP (HyperText Transfer Protocol), and may be interconnected with any form or medium of digital data communication (for example, a communication network). Examples of a communication network include a local area network ("LAN"), a wide area network ("WAN"), the Internet Work (for example, the Internet), and a peer-to-peer network (for example, an ad hoc peer-to-peer network), as well as any currently known network or a future developed network.

The computer readable medium may be incorporated in the above terminal device, or may exist alone without being assembled into the terminal device.

The computer readable medium carries one or more programs. The one or more programs, when being executed by the terminal device, cause the terminal device to: acquire an image, a lighting effect material image, and a first position of a simulated light source in a three-dimensional space, where the lighting effect material image includes lighting information; generate a first three-dimensional grid model of an object on a surface of an object image based on to the object image in the image; determine lighting information of points on the first three-dimensional grid model based on the first position of the simulated light source, distances from the points on the first three-dimensional grid model to a surface of the image, and the lighting effect material image; and render the object image in the image based on the lighting information of the points on the first three-dimensional grid model to acquire a first lighting effect rendering image of the image.

The computer program codes for performing the operations disclosed in the present disclosure may be written in one or more programming languages or combinations thereof. The programming languages include but are not limited to an object-oriented programming language, such as Java, Smalltalk, and C++, and a conventional procedural programming language, such as C language or a similar programming language. The program codes may be executed entirely on a user computer, partially on the user computer, as an independent software package, partially on the user computer and partially on a remote computer, or entirely on the remote computer or a server. In a case involving a remote computer, the remote computer may be connected to a user computer or an external computer through any kind of network including local area network (LAN) or wide area network (WAN) (for example, the remote computer may be connected through Internet connection by an Internet service provider).

Flow charts and block diagrams in the drawings illustrate the architecture, functions and operations that may be implemented by the system, method and computer program product according to the embodiments of the present disclosure. In this regard, each block in the flow charts or the block diagrams may represent a module, a program segment, or a part of codes. The module, the program segment, or the part of codes includes one or more executable instructions used for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of blocks in the block diagrams and/or flow charts and a combination of the blocks in the block diagrams and/or flow charts may be implemented by a dedicated hardware-based system that performs specified functions or operations, or may be implemented by a combination of dedicated hardware and computer instructions.

The units mentioned in the description of the embodiments of the present disclosure may be implemented by means of software, or otherwise by means of hardware. In some circumstances, a name of a unit does not constitute a limitation on the unit itself.

The functions described herein above may be performed, at least in part, by one or more hardware logic components. For example, without limitation, exemplary types of hardware logic components that may be used include: field programmable gate array (FPGA), application specific integrated circuit (ASIC), application specific standard product (ASSP), system on chip (SOC), complex programmable logical device (CPLD) and the like.

In the context of the present disclosure, the machine-readable medium may be a tangible medium that may include or store a program, and the program may be used by or in combination with an instruction execution system, apparatus or device. The machine-readable medium may be a machine-readable signal medium or a machine-readable storage medium. The computer-readable medium may include, but is not limited to, system, an apparatus, or a device in an electronic, magnetic, optical, electromagnetic, infrared, or semi-conductive form, or any suitable combination thereof. More specific examples of the machine-readable storage medium may include, an electrical connection with one or more wires, a portable computer disk, a hard disk, a random-access memory (RAM), a read-only memory (ROM), an erasable programmable read-only memory (EPROM or fast flash memory), an optical fiber, a portable compact disc read-only memory (CD-ROM), an optical storage device, a magnetic storage device or any suitable combination thereof.

A computer-readable storage medium is further provided according to an embodiment of the present disclosure. The computer-readable storage medium stores a computer program. The computer program, when being executed by the processor, performs the method according to any one of the embodiments in FIGS. 1 to 10 described above. The execution ways and beneficial effects of computer-readable storage medium are similar to the above, which are not repeated herein.

It should be noted that the terms "first", "second" and the like in the description are used for distinguishing an entity or operation from another entity or operation, but not intended to describe an actual relationship or order between these entities or operations. In addition, terms of "include", "comprise" or any other variants are intended to be non-exclusive. Therefore, a process, method, article or device including a series of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

The above are only specific implementations of the present disclosure, so that those skilled in the art can understand or implement the present disclosure. It is apparent for those skilled in the art to make many modifications to these embodiments. The general principle defined herein may be applied to other embodiments without departing from spirit or scope of the present disclosure. Therefore, the present disclosure is not limited to the embodiments illustrated herein, but should be defined by the broadest scope consistent with the principle and novel features disclosed herein.

The invention claimed is:

1. An image-based lighting effect processing method, comprising:
   acquiring an image, a lighting effect material image, and a first position of a simulated light source in a three-dimensional space, wherein the lighting effect material image is a material used to simulate a light spot with a pattern formed by the obstacle, the lighting effect material image comprises lighting information;
   generating, based on to an object image in the image, a first three-dimensional grid model of an object on a surface of the object image;
   determining lighting information of points on the first three-dimensional grid model based on the first position of the simulated light source, distances from the points on the first three-dimensional grid model to a surface of the image, and the lighting effect material image; and
   rendering the object image in the image based on the lighting information of the points on the first three-dimensional grid model, and acquiring a first lighting effect rendering image of the image,
   wherein the determining lighting information of points on the first three-dimensional grid model based on the first position of the simulated light source, distances from the points on the first three-dimensional grid model to a surface of the image, and the lighting effect material image comprises:
   determining projection points of the points of the first three-dimensional grid model on the lighting effect material image under illumination of the simulated light source, based on the first position of the simulated light source, and the distances from the points on the first three-dimensional grid model to the surface of the image; and
   determining lighting information of the projection points of the points of the first three-dimensional grid model on the lighting effect material image, as the lighting information of the points on the first three-dimensional grid model.

2. The method according to claim 1, wherein before the determining lighting information of points on the first three-dimensional grid model based on the first position of the simulated light source, distances from the points on the first three-dimensional grid model to a surface of the image, and the lighting effect material image, the method further comprises:
   rendering a background part of the image based on the lighting information of the lighting effect material image.

3. The method according to claim 1, wherein before the determining lighting information of points on the first three-dimensional grid model based on the first position of the simulated light source, distances from the points on the first three-dimensional grid model to a surface of the image, and the lighting effect material image, the method further comprises:
   rendering the image based on the first position of the simulated light source, to acquire a shadow of the object.

4. The method according to claim 3, wherein the rendering the image based on the first position of the simulated light source to acquire a shadow of the object comprises:
   determining a second position of a shadow formed by illuminating the object by the simulated light source on the image, based on the first position of the simulated light source; and
   rendering the image at the second position to acquire the shadow.

5. The method according to claim 4, wherein the determining a second position of a shadow formed by illuminating the object by the simulated light source on the image, based on the first position of the simulated light source comprises:
   segmenting and removing the object image from the image to acquire a mask of a region where the object image is located;
   determining an offset of the mask relative to the region, based on the first position of the simulated light source; and
   determining the second position of the shadow of the object on the image based on the offset of the mask relative to the region.

6. The method according to claim 1, wherein after the acquiring the first lighting effect rendering image, the method further comprises:
   processing the first lighting effect rendering image based on a predetermined diffuse reflection lighting model, to acquire a second lighting effect rendering image of the image.

7. The method according to claim 1, wherein the generating, based on an object image in the image, a first three-dimensional grid model of an object on a surface of the object image comprises:
   generating a second three-dimensional grid model of the object on a surface of the object based on a predetermined object matching algorithm; and
   smoothing a boundary part between the second three-dimensional grid model and the image to acquire the first three-dimensional grid model of the object.

8. The method according to claim 7, wherein the smoothing a boundary part between the three-dimensional grid model and the image to acquire a first three-dimensional grid model of the object comprises:
   inserting a plurality of points around the object on the image;
   connecting the plurality of points with points on an edge of the second three-dimensional grid model, to generate new grids; and
   generating the first three-dimensional grid model of the object based on the new grids and the second three-dimensional grid model.

9. The method according to claim 8, wherein the generating the first three-dimensional grid model of the object based on the new grids and the second three-dimensional grid model comprises:
   acquiring a third three-dimensional grid model of the object based on the new grids and the second three-dimensional grid model; and
   performing a filtering process on the third three-dimensional grid model, to acquire the first three-dimensional grid model of the object,
   wherein the filtering process comprises mean filtering.

10. A lighting effect processing apparatus, comprising:
    a processor; and
    a memory,
    wherein the memory stores a computer program; and the computer program, when executed by the processor, causes the processor to
    acquire an image, a lighting effect material image, and a first position of a simulated light source in a three-dimensional space, wherein the lighting effect material image is a material used to simulate a light spot with a pattern formed by the obstacle, the lighting effect material image comprises lighting information;

generate, based on to an object image in the image, a first three-dimensional grid model of an object on a surface of the object image;

determine lighting information of points on the first three-dimensional grid model based on the first position of the simulated light source, distances from the points on the first three-dimensional grid model to a surface of the image, and the lighting effect material image; and render the object image in the image based on the lighting information of the points on the first three-dimensional grid model, and acquiring a first lighting effect rendering image of the image, wherein the computer program, when executed by the processor, causes the processor to:

determine projection points of the points on the first three-dimensional grid model on the lighting effect material image under illumination of the simulated light source, based on the first position of the simulated light source, and the distances from the points on the first three-dimensional grid model to the surface of the image; and determine lighting information of the projection points of the points of the first three-dimensional grid model on the lighting effect material image, as the lighting information of the points on the first three-dimensional grid model.

11. The apparatus according to claim 10, wherein the computer program, when executed by the processor, causes the processor to:

render a background part of the image based on the lighting information of the lighting effect material image.

12. The apparatus according to claim 10, wherein the computer program, when executed by the processor, causes the processor to:

render the image based on the first position of the simulated light source, to acquire a shadow of the object.

13. The apparatus according to claim 12, wherein the computer program, when executed by the processor, causes the processor to:

determine a second position of a shadow formed by illuminating the object by the simulated light source on the image, based on the first position of the simulated light source; and render the image at the second position to acquire the shadow.

14. The apparatus according to claim 13, wherein the computer program, when executed by the processor, causes the processor to:

segment and remove the object image from the image to acquire a mask of a region where the object image is located;

determine an offset of the mask relative to the region based on the first position of the simulated light source; and determine the second position of the shadow of the object on the image based on the offset of the mask relative to the region.

15. The apparatus according to claim 10, wherein the computer program, when executed by the processor, causes the processor to:

process the first lighting effect rendering image based on a predetermined diffuse reflection lighting model, to acquire a second lighting effect rendering image of the image.

16. The apparatus according to claim 10, wherein the computer program, when executed by the processor, causes the processor to:

generate a second three-dimensional grid model of the object on a surface of the object based on a predetermined object matching algorithm; and smooth a boundary part between the second three-dimensional grid model and the image, to acquire the first three-dimensional grid model of the object.

17. The apparatus according to claim 16, wherein the computer program, when executed by the processor, causes the processor to:

insert a plurality of points around the object on the image;

connect the plurality of points with points on an edge of the second three-dimensional grid model, to generate new grids; and generate the first three-dimensional grid model of the object based on the new grids and the second three-dimensional grid model.

18. The apparatus according to claim 17, wherein the computer program, when executed by the processor, causes the processor to:

acquire a third three-dimensional grid model of the object based on the new grids and the second three-dimensional grid model; and perform a filtering process on the third three-dimensional grid model to acquire the first three-dimensional grid model of the object, wherein the filtering process comprises mean filtering.

19. A non-transitory computer-readable storage medium, storing a computer program, wherein the computer program, when executed by a processor, causes the processor to perform an image-based lighting effect processing method, wherein the method comprises:

acquiring an image, a lighting effect material image, and a first position of a simulated light source in a three-dimensional space, wherein the lighting effect material image is a material used to simulate a light spot with a pattern formed by the obstacle, the lighting effect material image comprises lighting information;

generating, based on to an object image in the image, a first three-dimensional grid model of an object on a surface of the object image;

determining lighting information of points on the first three-dimensional grid model based on the first position of the simulated light source, distances from the points on the first three-dimensional grid model to a surface of the image, and the lighting effect material image; and rendering the object image in the image based on the lighting information of the points on the first three-dimensional grid model, and acquiring a first lighting effect rendering image of the image, wherein the determining lighting information of points on the first three-dimensional grid model based on the first position of the simulated light source, distances from the points on the first three-dimensional grid model to a surface of the image, and the lighting effect material image comprises:

determining projection points of the points of the first three-dimensional grid model on the lighting effect material image under illumination of the simulated light source, based on the first position of the simulated light source, and the distances from the points on the first three-dimensional grid model to the surface of the image; and determining lighting information of the projection points of the points of the first three-dimensional grid model on the lighting effect material image, as the lighting information of the points on the first three-dimensional grid model.

* * * * *